(12) United States Patent
Stastny et al.

(10) Patent No.: US 10,479,412 B2
(45) Date of Patent: Nov. 19, 2019

(54) BODY CONNECTION OF AN AXLE AUXILIARY FRAME AND METHOD OF PRODUCING THE BODY CONNECTION

(71) Applicant: Benteler Automobiltechnik GmbH, Paderborn (DE)

(72) Inventors: Peter Michael Stastny, Delbrueck (DE); Dieter Friesen, Paderborn (DE); Reinhard Jaeger, Paderborn (DE); Thomas Henksmeier, Lippstadt (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 46 days.

(21) Appl. No.: 15/809,180

(22) Filed: Nov. 10, 2017

(65) Prior Publication Data
US 2018/0154947 A1   Jun. 7, 2018

(30) Foreign Application Priority Data
Nov. 14, 2016   (DE) .................. 10 2016 121 756

(51) Int. Cl.
| | | |
|---|---|---|
| *B62D 25/20* | (2006.01) | |
| *B62D 21/11* | (2006.01) | |
| *B60B 35/00* | (2006.01) | |
| *B21D 22/02* | (2006.01) | |
| *B23P 11/02* | (2006.01) | |
| *B62D 27/02* | (2006.01) | |

(52) U.S. Cl.
CPC ............ *B62D 25/20* (2013.01); *B21D 22/02* (2013.01); *B23P 11/02* (2013.01); *B60B 35/00* (2013.01); *B62D 21/11* (2013.01); *B62D 27/023* (2013.01)

(58) Field of Classification Search
CPC ...... B62D 25/20; B62D 27/023; B62D 21/11; B21D 22/02; B23P 11/02; B60B 35/00
USPC .............................................. 296/29, 30, 35.1
See application file for complete search history.

(56) References Cited

U.S. PATENT DOCUMENTS

| | | | | |
|---|---|---|---|---|
| 5,040,917 A | * | 8/1991 | Camuffo ................ | B62D 21/09 403/408.1 |
| 6,269,902 B1 | * | 8/2001 | Miyagawa ............ | B62D 21/11 180/312 |
| 7,334,958 B2 | * | 2/2008 | Muller ...................... | F16B 5/02 403/167 |

(Continued)

FOREIGN PATENT DOCUMENTS

| | | |
|---|---|---|
| DE | 102015208898 B3 | 8/2016 |
| EP | 1773649 B1 | 12/2010 |
| EP | 2902303 A1 | 8/2015 |

OTHER PUBLICATIONS

German Office Action, No. 10 2016 121 756.5, dated Jul. 24, 2017, 10 pages.

*Primary Examiner* — Jason S Morrow
*Assistant Examiner* — E Turner Hicks
(74) *Attorney, Agent, or Firm* — Hauptman Ham, LLP

(57) ABSTRACT

A body connection and a method of manufacturing the body connection is disclosed. A body connecting sleeve is formed in two parts from a spacer sleeve arranged in an axle auxiliary frame and from a body connecting sleeve which is coupled only to the upper shell of the axle auxiliary frame and substantially corresponds to the length of the centering extension. The body connecting sleeve is coupled exclusively in a form-fitting manner to the upper shell.

11 Claims, 1 Drawing Sheet

(56) References Cited

U.S. PATENT DOCUMENTS

| | | | |
|---|---|---|---|
| 7,584,815 B2 * | 9/2009 | Ogawa | B60G 3/20 180/312 |
| 7,771,137 B2 * | 8/2010 | Anzai | B62D 21/11 180/232 |
| 9,469,344 B2 * | 10/2016 | Haselhorst | B62D 21/11 |
| 2015/0217808 A1 | 8/2015 | Haselhorst et al. | |

* cited by examiner

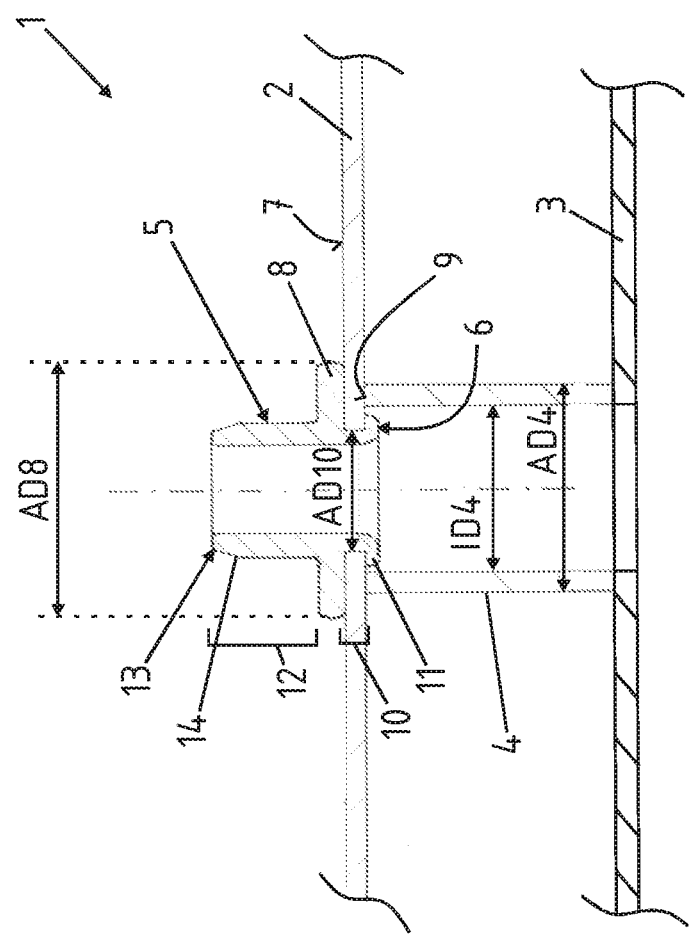

BODY CONNECTION OF AN AXLE AUXILIARY FRAME AND METHOD OF PRODUCING THE BODY CONNECTION

RELATED APPLICATIONS

The present application claims the priority of German Application Number 10 2016 121 756.5, filed Nov. 14, 2016, the disclosure of which is hereby incorporated by reference herein in its entirety.

BACKGROUND

1. Field of the Invention

The disclosure is related to a body connection and method of manufacturing the body connection, and more specifically, to a body connection of an axle auxiliary frame to a motor vehicle body.

2. Description of the Related Art

It is known from the prior art to produce self-supporting motor vehicle bodies. The motor vehicle body is produced in a self-supporting manner from structural components which are joined to one another. For the connection of chassis components, the latter are either coupled directly to the motor vehicle body via links, or else axle auxiliary frames are arranged below the motor vehicle body. The chassis components are then coupled to the axle auxiliary frame. The axle auxiliary frame is generally designed as a shell component.

The axle auxiliary frame is brought from below up to the motor vehicle body and coupled to the latter. This procedure is also referred to as a marriage. Since the chassis components which are arranged subsequently to be movable relative to the motor vehicle body require an appropriately high degree of precision in respect of their position, the operation to couple axle auxiliary frame and motor vehicle body is subject to exacting requirements in respect of precision.

It is therefore known from the prior art that the axle auxiliary frames have what are referred to as body connecting sleeves. The body connecting sleeves are designed as sleeve-like, elongate components which reach through the axle auxiliary frame. The body connecting sleeves are welded in the axle auxiliary frame. It is thereby possible to realize a precise position of the body connecting sleeve in the axle auxiliary frame. The coupling of body connecting sleeve to the body then necessitates in turn a precise position of axle auxiliary frame with respect to the motor vehicle body.

However, two points are disadvantageous here. Firstly, the body connecting sleeve is a component having high production costs because of the exacting requirements in terms of precision and sometimes greater requirements in terms of hardness. Furthermore, by means of the admission of heat during the welding process, the surrounding material in the zone affected by heat is potentially weakened. Furthermore, the welding process has a disadvantageous effect on the corrosion resistance of the axle auxiliary frame.

EP 2 902 303 A1 discloses a body connection in which a tooth lock washer is incorporated between axle auxiliary frame and body. The tooth lock washer increases the coefficient of friction and is coupled in an integrally bonded manner to the axle auxiliary frame itself. It is the object of the present invention to provide a body connection which can be produced simply and precisely, has low manufacturing costs and only insignificantly influences the strength and corrosion properties of the axle auxiliary frame.

SUMMARY

According to one exemplary embodiment, a body connection is provided for an axle auxiliary frame of a motor vehicle, wherein the axle auxiliary frame is designed as a hollow two-part shell component. A body connecting sleeve protrudes in relation to an upper shell with a centering extension in the direction of the motor vehicle body, also called body below. When axle auxiliary frame and body are put together, the protruding centering extension at least partially enters the body.

The body connecting sleeve comprises two part, as opposed to the prior art, where the body connecting sleeve is a single-part sleeve component reaching through the axle auxiliary frame and coupled to the latter in an integrally bonded manner The two-part design takes place in such a manner that a spacer sleeve, in particular an inner spacer sleeve, is arranged between the shells of the axle auxiliary frame. An upper body connecting sleeve which is separate therefrom and in particular substantially forms only the upper centering extension is coupled exclusively in a form-fitting manner only to the upper shell.

The substantial inventive advantages consist in that the entire continuous body connecting sleeve does not have to be produced as a highly precise component from an expensive material, but rather the actual body connecting sleeve substantially only forms the centering extension and reaches the required hardness values. Consequently less material at high raw material costs has to be provided. Furthermore, only a smaller component has to be subjected to precise manufacturing.

A further substantial advantage is the fact that an exclusively form-fitting coupling takes place. The coupling is formed in particular by means of crimping. Heat is therefore not admitted during a thermal joining process. Also, no geometrical alignment has to be undertaken before and during the joining process. The body connecting sleeve is introduced into an opening of the upper shell and is immediately coupled to the latter in a geometrically precise fit by means of the form-fitting coupling.

However, the body connecting sleeve not only has the task of centering when axle auxiliary frame and body are brought together. During operation of the motor vehicle, a force effect may occur between axle auxiliary frame and body in the event of a motor vehicle crash. A further task of the body connecting sleeve consists in having resistance to in particular a lateral force effect in the event of a vehicle crash such that the axle auxiliary frame does not shear off from the body.

For this purpose, the spacer sleeve is furthermore provided between the upper shell and the lower shell of the axle auxiliary frame. In interaction with the actual body connecting sleeve which is coupled only to the upper shell, bending or distortion of the shell edge region surrounding the body connecting sleeve is therefore avoided.

The spacer sleeve itself is clamped and/or adhesively bonded between the shells of the axle auxiliary frame.

As an advantageous refinement of the present invention, a radially encircling protruding collar is formed on the body connecting sleeve. The collar lies against the upper side of the upper shell of the axle auxiliary frame. The collar itself has an outer diameter which is identical to or greater than the outer diameter of the spacer sleeve. The spacer sleeve which lies against a lower side of the upper shell therefore engages under the collar and can prevent tilting of the body connecting sleeve or distortion of the edge region surrounding the body connecting sleeve.

Even a screw connection reaching through the body connection experiences an abutment by means of the spacer sleeve, and therefore the upper shell and the lower shell of the axle auxiliary frame are not deformed with respect to each other when the screw connection is tightened.

Furthermore preferably, the spacer sleeve has an inner diameter which is greater than the outer diameter of the body connecting sleeve. In particular, the inner diameter of the spacer sleeve is greater than the outer diameter in a foot region of the body connecting sleeve. Furthermore preferably, the inner diameter of the spacer sleeve is greater than 1.1 times the outer diameter of the body connecting sleeve, in particular in a foot region. The inner diameter is particularly advantageously greater than 1.2 times the outer diameter. By means of this measure, it is possible that the spacer sleeve is first of all introduced between the shells of the axle auxiliary frame.

In a later method step, it is then possible to arrange the body connecting sleeve in a manner reaching through an opening of the upper shell and to crimp same in the opening. The crimping operation is not obstructed by the spacer sleeve. Furthermore particularly preferably, the body connecting sleeve is designed to be hollow on the inside. In particular, a screw connection can therefore be produced in a manner reaching through the body connection. Furthermore, the dead weight and the use of material are reduced.

Furthermore particularly preferably, the body connecting sleeve is formed from a steel material, for example 20MnB4. The body connecting sleeve preferably has a strength of between 200 HV and 400 HV.

The method part of the object is achieved with a method for producing a body connection according to the above-mentioned features. The method is distinguished in that the upper shell is produced as a sheet-metal formed component in a forming die. In the forming die itself, during or after completion of the forming operation, the body connecting sleeve can be introduced into the shell and coupled to the latter in a form-fitting manner. In particular if a final calibrating operation of the upper shell takes place in the forming die, it can therefore be ensured that the body connecting sleeve has a geometrically precise position relative to the upper shell. Alternatively, the body connecting sleeve can also be introduced via a coupling operation of upper shell to lower shell. For example, upper shell and lower shell of the axle auxiliary frame can be joined thermally to each other. If, for this purpose, use is made of a welding device, the form-fitting coupling operation of the body connecting sleeve to the upper shell can be carried out in the welding device. If upper shell and lower shell are coupled to each other by a form-fitting coupling operation, the coupling of the body connecting sleeve to the upper shells can likewise take place during or directly after the coupling operation of upper shell and lower shell, preferably in the same die.

BRIEF DESCRIPTION OF THE DRAWINGS

For an understanding of embodiments of the disclosure, reference is now made to the following description taken in conjunction with the accompanying drawing, in which:

FIG. 1 is a schematic sectional FIGURE of an axle auxiliary frame with a body connecting sleeve in accordance with an exemplary embodiment.

DETAILED DESCRIPTION OF SOME EMBODIMENTS

Some embodiments will be now described with reference to the FIG. 1.

FIG. 1 shows a sectional view through an axle auxiliary frame 1 with upper and lower shells 2, 3. A spacer sleeve 4 is introduced between the upper and lower shells 2, 3. The spacer sleeve 4 is preferably clamped between upper and lower shells 2, 3. According to the invention, a body connecting sleeve 5 is coupled to the upper shell 2 in a form-fitting manner by means of a crimping 6, which is illustrated here. The upper body connecting sleeve 5 is substantially only the centering extension 12 protruding over an upper side 7 of the upper shell 2.

The upper body connecting sleeve 5 has a collar 8 protruding outward. An outer diameter AD8 of the collar 8 is designed to be larger than an outer diameter AD4 of the spacer sleeve 4. The collar 8 resting on the upper side 7 of the upper shell 2 is therefore supported on the side opposite the upper shell 2 by an end side 9 of the spacer sleeve 4. The collar 8 can optionally have a friction-increasing profile, for example a tooth profile, on the supporting surface of the shell 2. Furthermore preferably, an inner diameter ID4 of the spacer sleeve 4 is designed to be larger than an outer diameter AD10 of a foot region 10 of the body connecting sleeve 5. A repositioned edge 11 of the crimping 6 therefore does not come into contact during the crimping operation and/or is not obstructed by the spacer sleeve 4.

The actual centering extension 12 of the body connecting sleeve 5 protrudes in relation to the upper side 7 of the upper shell 2, in particular in relation to the collar 8, in the direction of a motor vehicle body, not illustrated specifically. At an upper end 13, the centering extension 12 can have an encircling bevel 14, as illustrated here. In particular, however, the predominant part of the centering extension 12 can also be designed in a conically tapering manner. When axle auxiliary frame 1 and motor vehicle body are brought together, this has a positive effect on the coupling operation.

The foregoing description of some embodiments of the invention has been presented for purposes of illustration and description. It is not intended to be exhaustive or to limit the invention to the precise form disclosed, and modifications and variations are possible in light of the above teachings or may be acquired from practice of the invention. The specifically described embodiments explain the principles and practical applications to enable one ordinarily skilled in the art to utilize various embodiments and with various modifications as are suited to the particular use contemplated. It is intended that the scope of the invention be defined by the claims appended hereto, and their equivalents. Further, it should be understood that various changes, substitutions and alterations can be made hereto without departing from the spirit and scope of the invention as described by the appended claims.

The invention claimed is:

1. A body connection for an axle auxiliary frame of a motor vehicle, the body connection comprising:
   an axle auxiliary frame including a hollow two-part shell component having an upper shell and a lower shell, and
   a body connecting sleeve protruding in relation to the upper shell with a centering extension in the direction of the body, wherein the body connecting sleeve includes two parts such that
a spacer sleeve is arranged between the upper shell and the lower shell of the axle auxiliary frame, and
an upper body connecting sleeve which is separate from the spacer sleeve, is coupled in a form-fitting manner only to the upper shell,
wherein the body connecting sleeve has a collar protruding in a radially encircling manner, and
wherein the collar has an outer diameter which is identical to or greater than an outer diameter of the spacer sleeve.

2. A body connection according to claim 1, wherein the spacer sleeve is clamped and/or adhesively bonded between the upper shell and the lower shell.

3. A body connection according to claim 1, wherein the body connecting sleeve is secured in a form-fitting manner in an opening of the upper shell.

4. A body connection according to claim 3, wherein the body connecting sleeve is crimped in the upper shell, in a manner reaching through the opening.

5. A body connection according to claim 1, wherein the spacer sleeve has an inner diameter which is greater than 1.1 times an outer diameter of the body connecting sleeve in a foot region.

6. A body connection according to claim 5, wherein the spacer sleeve and/or the body connecting sleeve are/is coupled only in a form-fitting manner to the axle auxiliary frame.

7. A body connection according to claim 6, wherein the body connecting sleeve is hollow on the inside.

8. A body connection according to claim 7, wherein the body connecting sleeve is formed from a steel material.

9. A method of manufacturing a body connection,
the body connection comprising:
an axle auxiliary frame including a hollow two-part shell component having an upper shell and a lower shell, and
a body connecting sleeve protruding in relation to the upper shell with a centering extension in the direction of the body,
wherein the body connecting sleeve includes two parts such that
a spacer sleeve is arranged between the upper shell and the lower shell of the axle auxiliary frame, and
an upper body connecting sleeve, which is separate from the spacer sleeve, is coupled in a form-fitting manner only to the upper shell,
wherein the body connecting sleeve has a collar protruding in a radially encircling manner, and
wherein the collar has an outer diameter which is identical to or greater than an outer diameter of the spacer sleeve,
the method comprising:
producing the upper shell as a sheet-metal formed component in a forming die,
introducing the body connecting sleeve into the upper shell in the forming die, and
coupling the body connecting sleeve to the upper shell in a form-fitting manner.

10. A body connection according to claim 1, wherein the inner diameter of the spacer sleeve is greater than 1.2 times the outer diameter of the body connecting sleeve.

11. A body connection for an axle auxiliary frame of a motor vehicle, the body connection comprising:
an axle auxiliary frame including a hollow two-part shell component having an upper shell and a lower shell, and
a body connecting sleeve protruding in relation to the upper shell with a centering extension in the direction of the body,
wherein the body connecting sleeve includes two parts such that
a spacer sleeve is arranged between the upper shell and the lower shell of the axle auxiliary frame, and
an upper body connecting sleeve which is separate from the spacer sleeve, is coupled in a form-fitting manner only to the upper shell,
wherein the body connecting sleeve has a collar protruding in a radially encircling manner,
wherein the collar has an outer diameter which is identical to or greater than an outer diameter of the spacer sleeve,
wherein the body connecting sleeve is secured in a form-fitting manner in an opening of the upper shell, and
wherein the body connecting sleeve is crimped in the upper shell, in a manner reaching through the opening.

* * * * *